Oct. 11, 1932.  E. C. MOHR  1,881,838
HOG WATERING DEVICE
Filed July 18, 1929   2 Sheets-Sheet 1
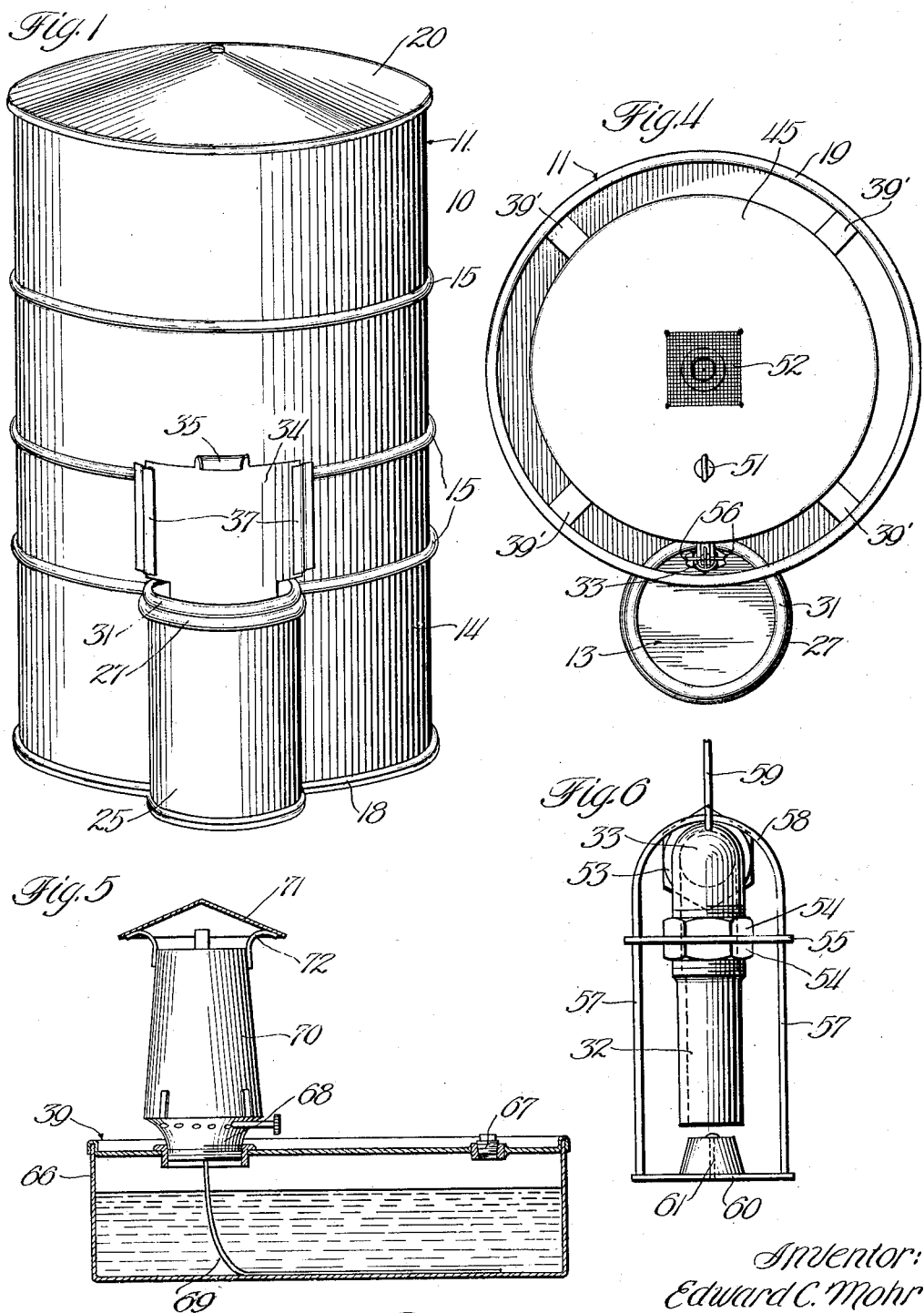
Inventor:
Edward C. Mohr
By Williams, Bradbury, McCaleb & Hinkle
Attys.

Oct. 11, 1932.  E. C. MOHR  1,881,838
HOG WATERING DEVICE
Filed July 18, 1929   2 Sheets-Sheet 2
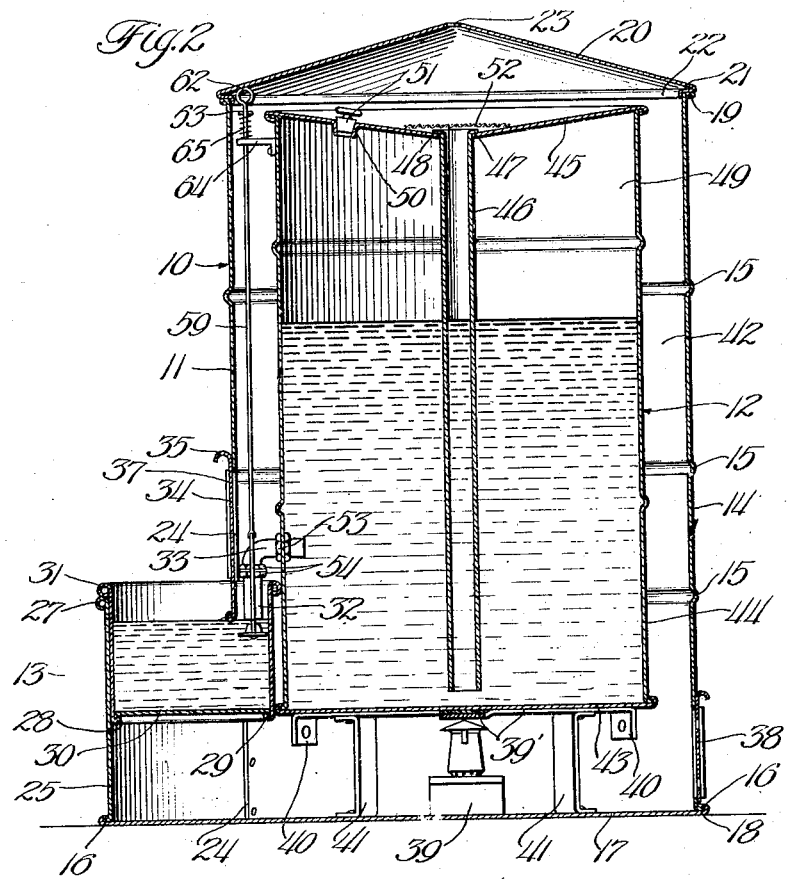
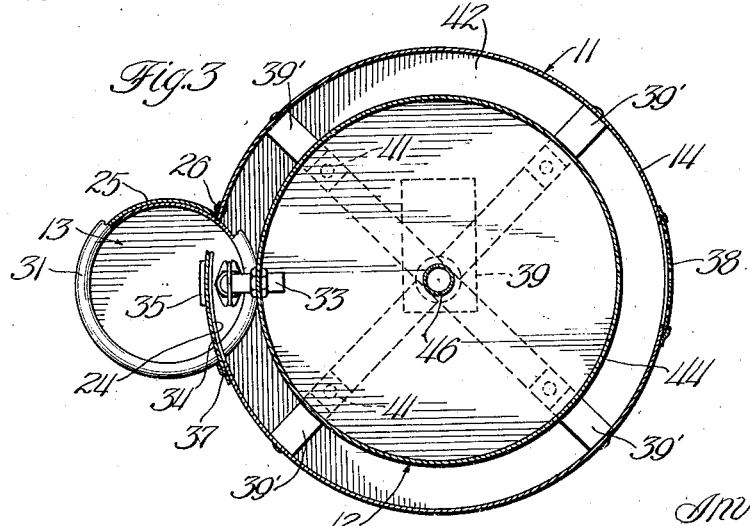
Inventor:
Edward C. Mohr
By Williams, Bradbury, McCaleb & Hinkle
Attys.

Patented Oct. 11, 1932

1,881,838

UNITED STATES PATENT OFFICE

EDWARD C. MOHR, OF PRESTON, IOWA

HOG WATERING DEVICE

Application filed July 18, 1929. Serial No. 379,082.

The present invention relates to hog watering devices and is particularly concerned with hog waterers provided with a drinking pan which is continuously supplied with water or other fluid, from a reserve tank.

The hog watering devices of this type of the prior art, have generally been constructed with drinking pans which are an integral part of the shell or casing of the watering device, or pans and tanks which are so secured to the watering device that it is practically impossible to repair the device without hauling the entire hog waterer to the repair shop, and the repair of the tank and pan is accomplished only with difficulty on account of the relative inaccessibility of parts which are subject to repair.

The prior hog waterers have also been complicated in their structure and difficult to manufacture except with special machinery, and difficult to maintain in a state of service, as well as inconvenient in the operation of filling the reserve tank of the watering device. Another disadvantage of the prior devices lies in the fact that no provision has been made for heating the drinking pan as well as the reserve tank.

One of the objects of the present invention is the provision of an improved hog waterer construction, which is economically manufactured and assembled and capable of long service without the necessity for repair.

Another object is the elimination of the foregoing difficulties and the provision of an improved hog waterer in which either the tank or the drinking pan may be removed from the supporting shell or casing and separately repaired with facility.

Another object is the provision of an improved hog watering casing and drinking pan construction in which the drinking pan is slidably supported in a complementary casing member carried by the hog waterer so that it is practically impossible for the hogs to dislodge the drinking pan from its proper position.

Another object is the provision of an improved hog watering device which is provided with a closed reserve tank adapted to be conveniently filled and provided with an improved form of valve adapted to be automatically actuated to facilitate the quick filling of the tank.

Other objects and advantages of the invention will be apparent from the following description and from the accompanying drawings, in which similar characters of reference indicate similar parts throughout the several views.

Referring to the drawings, of which there are two sheets;

Fig. 1 is a front elevational view of a hog watering device constructed according to the present invention;

Fig. 2 is a vertical, medial, sectional view showing the interior mechanism of the watering device;

Fig. 3 is a sectional view taken on the plane of the line 3—3 of Fig. 2;

Fig. 4 is a top plan view of the watering device with the cover removed;

Fig. 5 is a vertical, sectional view of the heating device;

Fig. 6 is a front elevational view of the valve for the discharge conduit.

All of the parts of the watering device are preferably constructed of non-corrodable metal such as galvanized iron, but while the embodiment chosen to illustrate the invention is a hog watering device constructed of galvanized iron, I desire it to be understood that many of the features of construction are of general application and may be utilized for analogous purposes other than the watering of hogs. The present description is therefore illustrative of one embodiment of the invention, and I do not wish to be limited to the particular uses described for the present construction.

Referring to Figs. 1 to 4, the hog watering device which is indicated in its entirety by the numeral 10, preferably includes an enclosing shell 11 adapted to enclose and support a reserve tank 12 and a drinking pan 13. The shell 11 may consist of a substantially cylindrical metal member having its side wall 14 preferably formed of a single piece of sheet metal having a plurality of circumferential corrugations 15 for reinforcing the wall. The lower end of the side wall 14 is preferably outwardly flanged at 16 for the purpose of supporting the bottom 17 having its outer edge 18 engaged about the flange 16, and the upper edge of the side wall 14 may be crimped over at 19 to provide a firm non-cutting edge.

The shell 11 is preferably provided with a cover 20 which may consist of a substantially conical member formed with an inwardly extending flange 21 for engaging the top edge of the shell 14 and with a downwardly extending flange 22 for engaging inside the shell 11. If desired, the cover 20 may have a small ventilation opening 23 for permitting escape of the gases from the heating apparatus, but as a general rule the leakage about the edge of the cover 20 is sufficient.

In order to support the drinking pan 13, the shell 11 has its side wall 14 cut away at one side adjacent the bottom as at 24 and a substantially cylindrical casing member 25 is carried by the wall 14 of the shell 11 for slidably or telescopically receiving and supporting the drinking pan 13. The casing member 25 may consist of a single piece of sheet metal bent to substantially cylindrical shape and sufficient in length to form substantially more than half of a cylinder.

Thus, referring to Fig. 3, it will be observed that the casing 25 extends about the drinking pan 13 for substantially three-fourths of the periphery of the drinking pan and the balance of the drinking pan 13 projects through the opening 24 into the shell 14. The cylindrical pan casing 25 is provided with outwardly bent flanges 26 at each side so that the pan casing 25 may be secured to the shell 11 by a plurality of rivets, and the lower edge of the pan casing 25 is provided with a similar flange 16 for engaging the flange 18 on bottom 17.

The upper edge 27 of the drinking pan casing 25 is preferably rolled over to reinforce the pan casing and to provide a construction which cannot injure the animals. The drinking pan 13 preferably comprises a substantially cylindrical member having an outer surface which is complementary to the inner surface of the pan casing 25 so that the drinking pan 13 may be slidably received in the pan casing 25 and firmly supported therein.

In the embodiment illustrated, the bottom edge of the wall of the drinking pan 13 is bent upward at 28 to engage a downwardly extending flange 29 on the bottom 30, thereby providing a construction in which the outer wall of the drinking pan 13 has no projections so that it may be telescopically received within the drinking pan casing 25. The upper edge 31 of the drinking pan is provided with a curved or rolled flange adapted to form a stop for definitely determining the position of the drinking pan 13 in casing 25 and for preventing injury to the necks of the animals using the watering device.

It will thus be observed that when the drinking pan 13 is in proper position, it projects inside the shell 11 below the discharge end 32 of a discharge conduit 33 carried by reserve tank 12. In order that the drinking pan 13 may be removed from the casing 25, it is of course necessary that the tank 12 be first removed and the opening 24 in the side wall 14 of the shell 11 is extended sufficiently above the upper edge 27 of casing 25 so that the pan 13 may be slid upward above the edge 27 and then outward to the left in Fig. 2.

In order to prevent the animals from injuring the mechanism of the discharge conduit 33 and to prevent injury to the animals, the side wall 14 is provided with a closure 34 for the opening 24 above the pan 13. The closure 34 may consist of a piece of sheet metal having a hook 35 formed at its upper edge for manipulation of the closure and having a rolled lower edge 36 adapted to project downward into the pan 13 in front of the discharge conduit 33. The closure 34 may be slidably supported on the shell 11 by a pair of guides 37 secured to the side wall 14 by rivets or other convenient fastening means.

The shell 11 is also preferably provided with a similar closure 38 located adjacent the bottom in the side wall 14 to permit the insertion or manipulation of the heating device 39.

In order to provide a support for the tank 12, the side walls 14 of the shell 11 may be provided with a plurality of transversely extending frame members 39' having attaching flanges 40 secured to the side walls 14 by rivets or other fastening means, and the transverse frame members 39 may be provided with additional support in the form of vertical frame members 41 secured to the bottom 17 and to the frame members 39.

The tank 12 preferably comprises a substantially cylindrical member of a lesser diameter than the shell 14 so that when the tank 12 is supported on the frame members 39', an annular air space 42 is formed with the shell 11 for the passage of the heated gases from the heating device 39. The bottom 43 of the tank 12 may be secured to side walls 44 by flanging the bottom 43 over an annular flange on side walls 44 and the tank 12 is preferably provided with a frusto-conical top 45 forming a funnel for filling the tank.

The top 45 may be secured to side walls 44 in a similar manner and the top is provided with a centrally located, downwardly extending conduit or spout 46 which may be secured in an opening 47 in the top by soldering a flange 48 carried by spout 46 to the top 45. The spout 46 extends to a point adjacent the bottom 43 of tank 12 substantially below the lower end 32 of discharge conduit 33, thereby forming an annular vacuum chamber 49 above the level of the water in the tank 12.

In order to expedite the filling of the tank 12, the tank may be provided with an air opening 50 having a plug 51 which is airtight, and the funnel 45 is preferably provided with a strainer 52 which may comprise a piece of metal screen soldered in the funnel 45 above the spout 46.

The tank 12 is provided with a discharge conduit 33 which may consist of an L-shaped metal pipe having its ends threaded and the pipe 33 may be secured in the side wall 44 by a pair of nuts 53 engaging the side wall 44. The downwardly turned end 32 of pipe 33 may also be provided with a pair of nuts 54 adapted to secure a guide member 55 which may consist of a sheet metal member formed with slots 56 at each side and formed with a central aperture adapted to receive pipe 33.

The guide 55 is adapted to slidably receive the two legs 57 of a stirrup 58 which is provided with an upwardly extending actuating rod 59. The legs 57 of stirrup 58 support at their lower ends a sheet metal bridge 60 which is adapted to carry a tapered plug 61 of rubber or the like adapted to effect a water-tight closure of the discharge conduit 33.

In order to fill the tank 12 quickly, it is desirable to open the air opening 50, but when the plug 51 has been removed, the vacuum chamber 49 is in communication with the atmosphere and consequently all of the water in tank 12 would run out if the conduit 33 were not closed. The present device may be provided with an actuating rod 59, the upper end of which may be formed with a loop 62 for convenient manipulation, and the loop 62 may be extended to be engaged by the cover 20.

In order automatically to close the valve 61 when the cover 20 is removed, the actuating rod 59 may be provided with a transverse pin 63 and a guide 64 carried by tank 12, and a compression spring 65 may be tensioned between the pin 63 and guide 64, tending to move the valve 61 to the closed position. The spring 65 is under relatively light tension so that when the cover 20 is in place, the valve 61 is moved to open position, and it will thus be observed that the removal of the cover automatically places the tank in condition for filling, and if desired, the air opening 60 may be opened to expedite the filling of the tank. Since the mechanism of the valve 61 and actuating rod 59 is entirely carried by the tank 12, the tank 12 may be removed from the shell 11 without interfering with the mechanism.

The heating device 39 may consist of an oil reservoir 66 provided with a filling plug 67 and a burner 68 having a wick 69. The burner 68 supports a chimney 70 preferably of metal, and formed with a hood 71 supported in spaced relation to the top of the chimney 70 by a plurality of strips 72. The hood 71 deflects the heated gases from immediate contact with the bottom of the tank 12.

It will thus be observed that I have invented a hog watering device of improved construction, in which the tank is provided with a valve which may be automatically moved to filling position by the removal of the cover, and the present watering device is provided with a drinking pan which may be most conveniently removed for repair or cleaning. The drinking pan is, however, firmly supported in its casing so that it cannot be dislodged by the animals themselves, and the valve mechanism is protected against injury by the animals.

The present watering device may be constructed without use of special tools other than those which form a part of the equipment of any tinner's shop, and the present device is capable of long and efficient service without substantial expenditure for repair.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a hog watering device, the combination of a substantially cylindrical shell with a substantially cylindrical casing member carried by the side of said shell, said shell and casing having a communicating opening, a substantially cylindrical drinking pan, slidably mounted in said casing and supported thereby, said opening being extended in said shell above said pan to facilitate its removal, and a slidable closure for the upper part of said opening.

2. In a hog waterer, the combination of a shell with a tank and drinking pan carried thereby, a threaded discharge conduit carried by said tank and leading into said pan, a guide member carried by said discharge conduit, a stirrup having legs slidably mounted in said guide, a tapered closure carried by said stirrup and an actuating rod extending from said stirrup to a point adjacent the top of the tank.

3. In a watering device for hogs and the like, the combination of a supporting and enclosing outer shell with a drinking pan supporting casing of semi-cylindrical shape and of a curvature greater than one hundred and eighty degrees fixedly mounted on said outer shell, a reservoir mounted in said outer shell, and having a discharge conduit projecting into said pan casing, and a drinking pan having a shape complementary to said casing and adapted to fit into said casing to be frictionally retained therein, whereby said pan is removably supported but fixedly secured against dislodgment by animals.

4. In a watering device for hogs and the like, the combination of a supporting and enclosing outer shell with a drinking pan supporting casing fixedly mounted on said outer shell, a reservoir mounted in said outer shell, and having a discharge conduit projecting into said pan casing, a drinking pan having a shape complementary to said casing to fit frictionally into said casing and to abut against said reservoir, whereby said pan is removably supported but fixedly secured against dislodgment by animals, a closure for said discharge conduit, and resilient means for urging said closure to closed position.

5. In a watering device for hogs and the like, the combination of a supporting and enclosing outer shell with a drinking pan supporting casing fixedly mounted on said outer shell, a reservoir mounted in said outer shell, and having a discharge conduit projecting into said pan casing, a drinking pan having a shape complementary to said casing and adapted to fit frictionally into said casing, whereby said pan is removably supported but fixedly secured against dislodgment by animals, a closure for said discharge conduit, resilient means for urging said closure to closed position, and means actuated by the cover to open said closure.

6. In a watering device for hogs and the like, the combination of a supporting and enclosing outer shell with a drinking pan supporting casing fixedly mounted on said outer shell, a reservoir mounted in said outer shell, and having a discharge conduit projecting into said pan casing, a drinking pan having a shape complementary to said casing and adapted to fit frictionally into said casing, whereby said pan is removably supported but fixedly secured against dislodgment by animals, said shell and casing having a communicating opening extending above said pan to facilitate its removal, and a slidable closure for the upper part of said opening.

7. In a watering device for hogs and the like, the combination of a supporting and enclosing outer shell with a drinking pan supporting casing fixedly mounted on said outer shell, a reservoir mounted in said outer shell, and having a discharge conduit projecting into said pan casing, a drinking pan having a shape complementary to said casing and adapted to fit frictionally into said casing, whereby said pan is removably supported but fixedly secured against dislodgment by animals, said shell and casing having a communicating opening extending above said casing to facilitate removal of said pan, and a slidable closure for said opening, said latter closure including a depending apron for covering said discharge conduit in said pan.

8. In a watering device for hogs and the like, the combination of a supporting and enclosing outer shell with a drinking pan supporting casing fixedly mounted on said outer shell, a reservoir mounted in said outer shell, and having a discharge conduit projecting into said pan casing, a drinking pan having a shape complementary to said casing to fit frictionally into said casing, whereby said pan is removably supported but secured against dislodgment by animals, said shell and casing having a communicating opening extending above said casing to facilitate removal of said pan, and a slidable closure for the upper part of said opening, said latter closure including a depending apron for covering said discharging conduit in said pan, and a tubular formation on the lower end of said closure, to protect animals from being cut by said closure.

9. In a watering device, the combination of a closed tank having a discharge conduit near its lower end and a filling conduit, with a casing for enclosing said tank and a cover for said casing, a valve for said conduit and spring means controlled by said cover for opening said valve.

In witness whereof, I hereunto subscribe my name this 8th day of July, 1929.

EDWARD C. MOHR.